United States Patent
Carroll (10) Patent No.: US 9,842,155 B2
(45) Date of Patent: Dec. 12, 2017

(54) SYSTEMS AND METHODS FOR FILE LOADING

(71) Applicant: Christopher Paul Carroll, Framingham, MA (US)

(72) Inventor: Christopher Paul Carroll, Framingham, MA (US)

(*) Notice: Subject to any disclaimer, the term of this patent is extended or adjusted under 35 U.S.C. 154(b) by 74 days.

(21) Appl. No.: 14/983,786

(22) Filed: Dec. 30, 2015

(65) Prior Publication Data
US 2016/0112435 A1    Apr. 21, 2016

Related U.S. Application Data (63) Continuation of application No. 13/314,413, filed on Dec. 8, 2011, now abandoned.
(60) Provisional application No. 61/421,014, filed on Dec. 8, 2010.

(51) Int. Cl.
| | | |
|---|---|---|
| G06F 7/00 | (2006.01) | |
| G06F 17/00 | (2006.01) | |
| G06F 17/30 | (2006.01) | |
| G06F 21/10 | (2013.01) | |
| G06F 21/62 | (2013.01) | |

(Continued)

(52) U.S. Cl.
CPC .. *G06F 17/30589* (2013.01); *G06F 17/30082* (2013.01); *G06F 21/10* (2013.01); *G06F 21/6218* (2013.01); *H04L 63/0428* (2013.01); *G06F 2221/2143* (2013.01)

(58) Field of Classification Search
CPC .. G06F 17/302; G06F 17/30215; G06F 3/067; G06F 1/1632; G06F 11/141; G06F 11/2084; G06F 12/0866; G06F 17/3028; G06F 3/064

USPC ......... 711/162, 112, 156; 707/E17.032, 640, 707/E17.005, E17.007, E17.01, 654, 661, 707/E17.002; 713/165, 193

See application file for complete search history.

(56) References Cited

U.S. PATENT DOCUMENTS

| | | | | |
|---|---|---|---|---|
| 6,542,975 B1* | 4/2003 | Evers | .................. | G06F 11/1458 711/112 |
| 8,005,458 B2* | 8/2011 | Baik | ..................... | G06F 21/554 340/539.11 |

(Continued)

FOREIGN PATENT DOCUMENTS

| | | |
|---|---|---|
| GB | 2398670 A | 8/2004 |
| GB | 2398671 A | 8/2004 |

OTHER PUBLICATIONS

GB Search Report dated Mar. 23, 2012 for GB Application No. GB1121131.5.

*Primary Examiner* — Heather Herndon
*Assistant Examiner* — Cecile Vo (57) ABSTRACT

The application describes systems and methods for preventing the distribution of large volumes of electronic data by loading selected sensitive files with pad data to increase the size of the files such that file transfer, distribution, or downloading to removable media storage devices is more cumbersome. In one aspect, a file loading system comprises a datastore for storing a plurality of data files where each of the plurality of data files includes information and a processor arranged to: access the plurality of data files in the datastore, and load a data pad into one or more of the plurality of data files to increase the size of the one or more of the plurality of data files.

18 Claims, 6 Drawing Sheets

(51) Int. Cl.
*H04L 29/06* (2006.01)
*G06F 13/14* (2006.01)

(56) References Cited

U.S. PATENT DOCUMENTS

| | | | |
|---|---|---|---|
| 8,527,724 B2* | 9/2013 | Banzhaf | G06F 11/1076 |
| | | | 711/163 |
| 2004/0044894 A1* | 3/2004 | Lofgren | G06T 1/0028 |
| | | | 713/176 |
| 2005/0097053 A1 | 5/2005 | Aaltonen et al. | |
| 2006/0136356 A1 | 6/2006 | Hua et al. | |
| 2007/0050321 A1* | 3/2007 | Albert | G06F 17/30244 |
| 2008/0175391 A1 | 7/2008 | Finkelstein et al. | |

* cited by examiner

SYSTEMS AND METHODS FOR FILE LOADING

REFERENCE TO RELATED APPLICATIONS

This application is a continuation of U.S. patent application Ser. No. 13/314,413, filed on Dec. 8, 2011, which claims priority to and the benefit of U.S. Provisional Patent Application No. 61/421,014, filed on Dec. 8, 2010, and entitled "Systems and Methods for File Loading." The entire contents of the above-referenced applications are incorporated herein by reference.

FIELD OF THE DISCLOSURE

The disclosure relates generally to systems and methods for data file handling. More particularly, in various aspects, the disclosure relates to data file loading.

BACKGROUND

Recently, there have been incidents were large amounts of electronic data and electronic files have been extracted from secure computing systems and networks by users with removable media devices. For example, in the Wikileaks incident, a U.S. Army specialist was able to download thousands of confidential and secret files to CD-ROMS via a computer terminal, which he then allegedly carried outside a secure facility.

In the past, before the proliferation of electronic information systems, it was not possibly for one individual to access and transport such a large volume of secret documents. The physical size and volume of such documents in printed form prevented an individual from conveniently or practically transporting such documents without raising awareness or triggering detection by security personnel.

Existing data security measures typically rely on an array of physical and electronic security measures to prevent the release of sensitive personal, company, and/or government information. Many security measures are focused on preventing intruders from breaking physical and electronic security.

Electronic security measures include encryption, authentication, firewalls, passwords, virus detection, Trojan horse detection, and other network security tools. Physical security mechanisms include locked rooms, fences, secure facilities, background checks, cameras, badges, and personnel searches. Most security mechanisms provide perimeter security to prevent unauthorized entry and/or egress from a secure facility or electronic computing system.

Unfortunately, existing security measures have proven inadequate to prevent personnel with access to large volumes of sensitive electronic data from conveniently downloading such data and/or files to removable media which can then be easily concealed for physical transport from a secure facility.

SUMMARY

The application, in various embodiments, addresses the deficiencies of current information security systems by preventing the convenient distribution of large volumes of electronic data.

In one aspect, the present disclosure uses an electronic and/or computer system to add data (e.g., a pad and/or random data) to a data file to increase the size of the file such that certain file operations (e.g., download, transfer, copy, attach, and so on) become time consuming, costly, and/or use large amounts of data storage space. The amount of data added to a file can be dynamic depending on the storage and/or processing capabilities of the computing system and/or network where the information resides. For a system with more processing power and/or more data storage, more data may be loaded into select data files. As processing power and storage expand over time, the amount of data added to select files can be proportionally increased. Thus, the invention makes it substantially more difficult for a person to extract large volumes of data files without increased data storage and processing power and, thereby, an increased possibility of detection.

In one aspect, the amount of padding added to a file may correspond to the data storage and/or processing power of a computer system. In another aspect, the amount of padding added to a file may correspond to the degree of secrecy and/or value of the information within a file. In yet another aspect, the amount of padding added to a file may correspond to the amount of processing power and/or storage capability associated with known removable media storage devices (e.g., memory sticks, USB memory devices, CD-ROMs, CD-RWs, disks, and the like), and/or the amount of storage capacity of a computer system, network, and/or database (i.e., datastore). In a further aspect, the amount of padding added to a file may depend on a combination of factors, including one or more the factors discussed above.

In another aspect, a file loading system comprises a datastore for storing a plurality of data files where each of the plurality of data files includes information and a processor arranged to: access the plurality of data files in the datastore, and load a data pad into one or more of the plurality of data files to increase the size of the one or more of the plurality of data files. By increasing the size of one or more data files to particular amounts, the ability to transfer one or more data files to certain portable media storage devices or via an network transfer is inhibited and/or delayed, allowing for more easy detection and/or prevention of unauthorized data transfers.

DRAWINGS

The foregoing and other objects and advantages of the disclosure will be appreciated more fully from the following further description thereof, with reference to the accompanying drawings. The skilled person in the art will understand that the drawings, described below, are for illustration purposes only. The drawings are not intended to limit the scope of the applicant's teaching in any way.

DESCRIPTION

While the applicant's teachings are described in conjunction with various embodiments, it is not intended that the applicant's teachings be limited to such embodiments. On the contrary, the applicant's teachings encompass various alternatives, modifications, and equivalents, as will be appreciated by those of skill in the art.

The application describes systems and methods for preventing the distribution of large volumes of electronic data by loading selected sensitive files with pad data to increase the size of the files such that file transfer, distribution, or downloading to removable media storage devices is more cumbersome.

Figure 1:
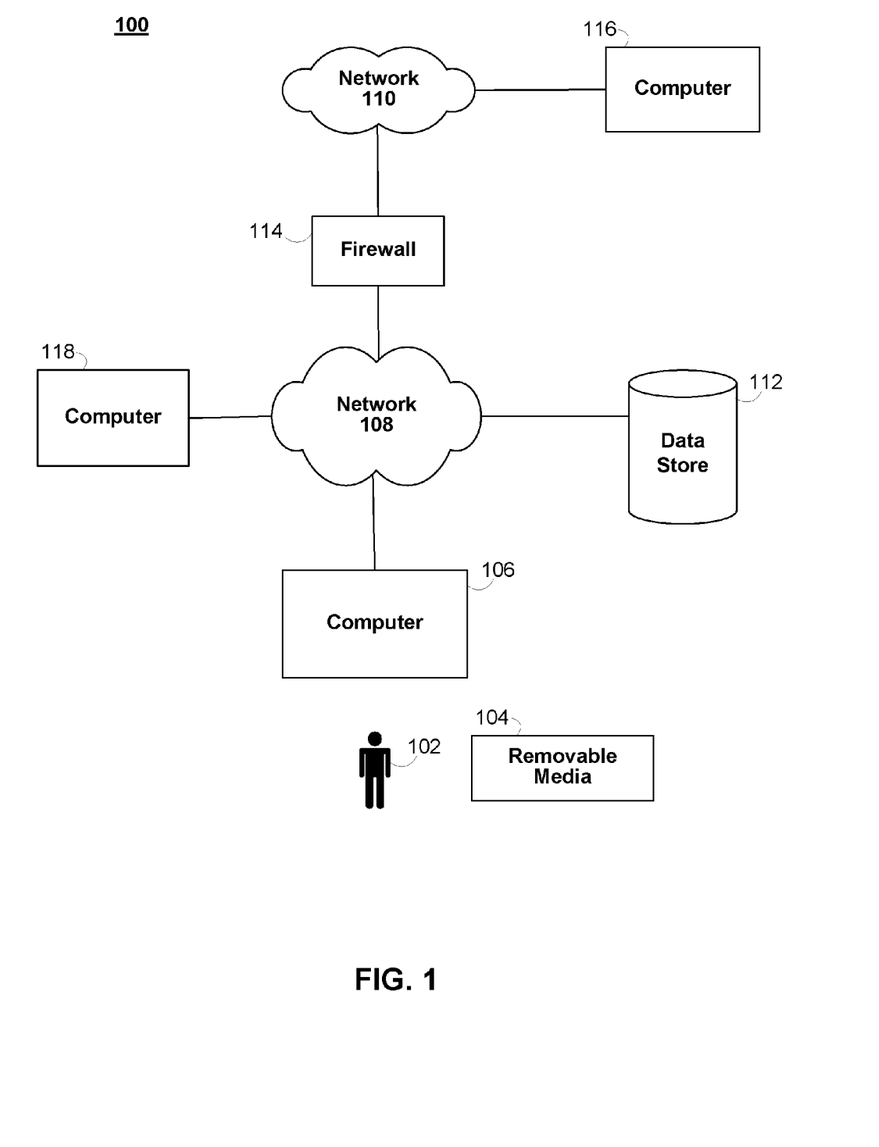
FIG. 1 includes a diagram of a system according to an illustrative embodiment of the invention.

FIG. 1 includes a diagram of an information system 100. The information system 100 includes a user 102 having removable media 104. The removable media may include any type of removable and/or portable data storage device such as, without limitation, a flash drive, memory stick, DVD, CD-ROM, CD-RW, wireless memory device, floppy disk, portable hard disk, tape drive, and solid state memory device. The system 100 includes a network 108, a data store 112, computer 106, computer 118, a firewall 114, another network 110, and computer 116. The network 110 may be a network such as the Internet and/or an Ethernet associated with a person, company, facility, building, government entity, and the like. The network 108 may be a private network. The network 110 may include the network 108. The networks 108 and 110 may include telecommunications, wired, and/or wireless network components/infrastructure.

In one aspect, the network 108 includes a firewall 114 that provides secure access control to and/or from network 108. Datastore 112 may include a database that stores electronic information and/or data. The computers 118, 106, and 116 may include personal computers and/or network clients associated with one or more users such as user 102.

Figure 2:
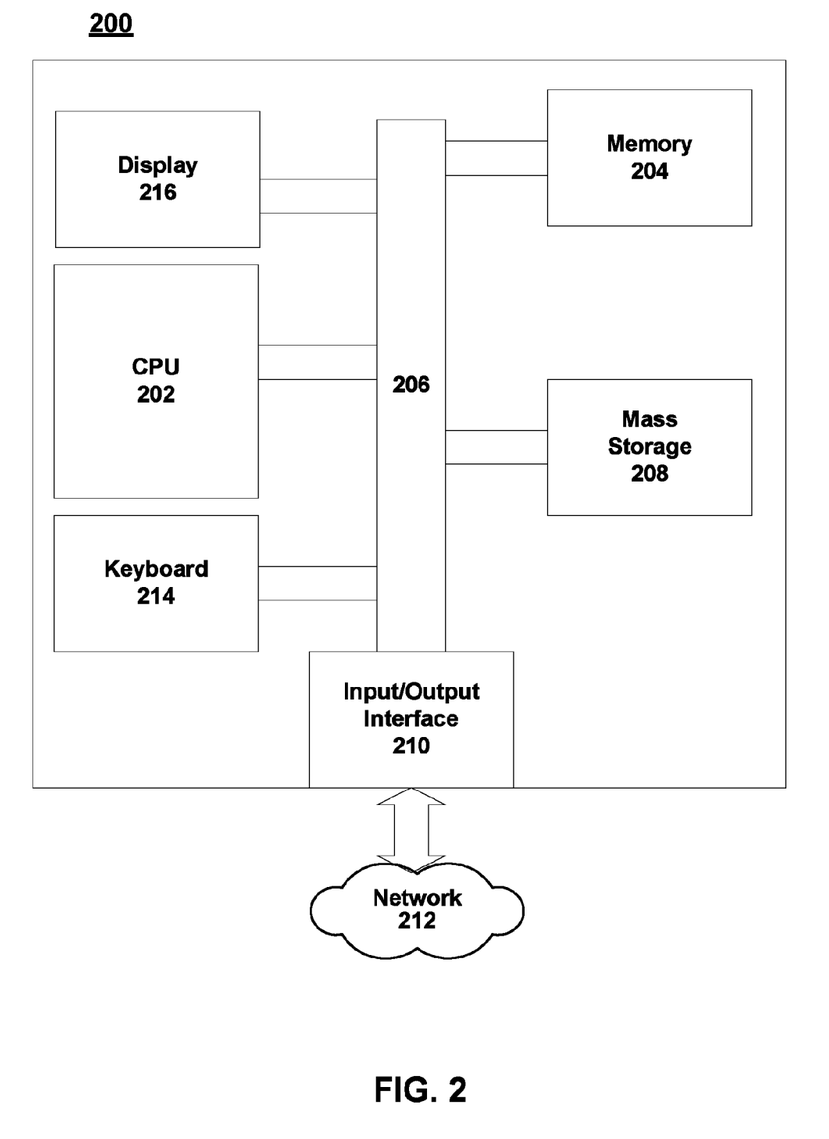
FIG. 2 includes a functional block diagram of a computer shown in FIG. 1 according to an illustrative embodiment of the disclosure.

FIG. 2 includes a functional block diagram of a general purpose computer system, e.g., a computer, for performing the functions of the computer 106, 118, and/or 116 of FIG. 1 according to an illustrative embodiment of the disclosure. The exemplary computer system 200 includes a central processing unit (CPU) 202, a memory 204, and an interconnect bus 206. The CPU 202 may include a single microprocessor or a plurality of microprocessors for configuring computer system 200 as a multi-processor system. The memory 204 illustratively includes a main memory and a read only memory. The computer 200 also includes the mass storage device 208 having, for example, various disk drives, tape drives, etc. The main memory 204 also includes dynamic random access memory (DRAM) and high-speed cache memory. In operation, the main memory 204 stores at least portions of instructions and data for execution by the CPU 202.

The mass storage 208 may include one or more magnetic disk or tape drives or optical disk drives or memory sticks, for storing data and instructions for use by the CPU 202. At least one component of the mass storage system 208, preferably in the form of a disk drive or tape drive, stores the database used for processing data and/or electronic medical records of the system 100. The mass storage system 208 may also include one or more drives for various portable media, such as a floppy disk, a compact disc read only memory (CD-ROM, DVD, CD-RW, and variants), or an integrated circuit non-volatile memory adapter (i.e. PC-MCIA adapter) to input and output data and code to and from the computer system 200.

The computer system 200 may also include one or more input/output interfaces for communications, shown by way of example, as interface 210 for data communications via the network 212 (or network 114). The data interface 210 may be a modem, an Ethernet card or any other suitable data communications device. To provide the functions of a computer 102 according to FIG. 1, the data interface 210 may provide a relatively high-speed link to a network 212 (or network 114 of FIG. 1), such as an intranet, internet, or the Internet, either directly or through an another external interface 116. The communication link to the network 212 may be, for example, optical, wired, or wireless (e.g., via satellite or cellular network). Alternatively, the computer system 200 may include a mainframe or other type of host computer system capable of Web-based communications via the network 212. The computer system 200 may include software for operating an network application such as a web server and/or web client.

The computer system 200 also includes suitable input/output ports, that may interface with a portable data storage device, or use the interconnect bus 206 for interconnection with a local display 216 and keyboard 214 or the like serving as a local user interface for programming and/or data retrieval purposes. The display 216 may include a touch screen capability to enable users to interface with the system 200 by touching portions of the surface of the display 216. Server operations personnel may interact with the system 200 for controlling and/or programming the system from remote terminal devices via the network 212.

The computer system 200 may run a variety of application programs and store associated data in a database of mass storage system 208. One or more such applications may include file loading as described later herein with respect to FIGS. 3-6.

The components contained in the computer system 200 are those typically found in general purpose computer systems used as servers, workstations, personal computers, network terminals, and the like. In fact, these components are intended to represent a broad category of such computer components that are well known in the art.

As discussed above, the general purpose computer system 200 may include one or more applications that provide electronic file loading in accordance with embodiments of the invention. The system 200 may include software and/or hardware that implements a web server application. The web server application may include software such as HTML, XML, WML, SGML, PHP (Hypertext Preprocessor), CGI, and like languages.

The foregoing features of the disclosure may be realized as a software component operating in the system 200 where the system 200 is Unix workstation or other type of workstation. Other operation systems may be employed such as, without limitation, Windows, MAC OS, and LINUX. In some aspects, the controller 102 software can optionally be implemented as a C language computer program, or a computer program written in any high level language including, without limitation, C++, Fortran, Java, or Visual BASIC. Certain script-based programs may be employed such as XML, WML, PHP, and so on. Additionally, general techniques for high level programming are known, and set forth in, for example, Stephen G. Kochan, Programming in C, Hayden Publishing (1983). The system 200 may use a DSP for which programming principles well known in the art.

As stated previously, the mass storage 208 may include a database. The database may be any suitable database system, including the commercially available Microsoft Access database, and can be a local or distributed database system. The design and development of suitable database systems are described in McGovern et al., A Guide To Sybase and SQL Server, Addison-Wesley (1993). The database can be supported by any suitable persistent data memory, such as a hard disk drive, RAID system, tape drive system, floppy diskette, or any other suitable system. The system 200 may include a database that is integrated with the system 200, however, it will be understood by those of ordinary skill in the art that in other embodiments the database and mass storage 208 can be an external element.

In certain embodiments, the system 200 may include an Internet browser program and/or be configured operate as a web server. In some embodiments, the client and/or web server may be configured to recognize and interpret various network protocols that may be used by a client or server program. Commonly used protocols include Hypertext Transfer Protocol (HTTP), File Transfer Protocol (FTP), Telnet, and Secure Sockets Layer (SSL), for example. However, new protocols and revisions of existing protocols may be frequently introduced. Thus, in order to support a new or revised protocol, a new revision of the server and/or client application may be continuously developed and released.

In one embodiment, the system 100 includes a networked-based, e.g., Internet-based, application that may be configured and run on the system 200 and/or any combination of the other components of the system 100. The computer 106, 118, and/or 116 (or system 200) may include a web server running a Web 2.0 application or the like. Web applications running on the computer 106, 118, and/or 116 may use server-side dynamic content generation mechanisms such, without limitation, Java servlets, CGI, PHP, or ASP. In certain embodiments, mashed content may be generated by the web browser 144 via, for example, client-side scripting including, without limitation, JavaScript and/or applets.

In certain embodiments, the computer 106, 118, and/or 116 may include applications that employ asynchronous JavaScript+XML (Ajax) and like technologies that use asynchronous loading and content presentation techniques. These techniques may include, without limitation, XHTML and CSS for style presentation, document object model (DOM) API exposed by a web browser, asynchronous data exchange of XML data, and web browser side scripting, e.g., JavaScript. Certain web-based applications and services may utilize web protocols including, without limitation, the services-orientated access protocol (SOAP) and representational state transfer (REST). REST may utilize HTTP with XML.

The computer 106, 118, and/or 116 may also provide enhanced security and data encryption. Enhanced security may include access control, biometric authentication, cryptographic authentication, message integrity checking, encryption, digital rights management services, and/or other like security services. The security may include protocols such as IPSEC and IKE. The encryption may include, without limitation, DES, AES, RSA, and any like public key or private key based schemes.

Figure 3:
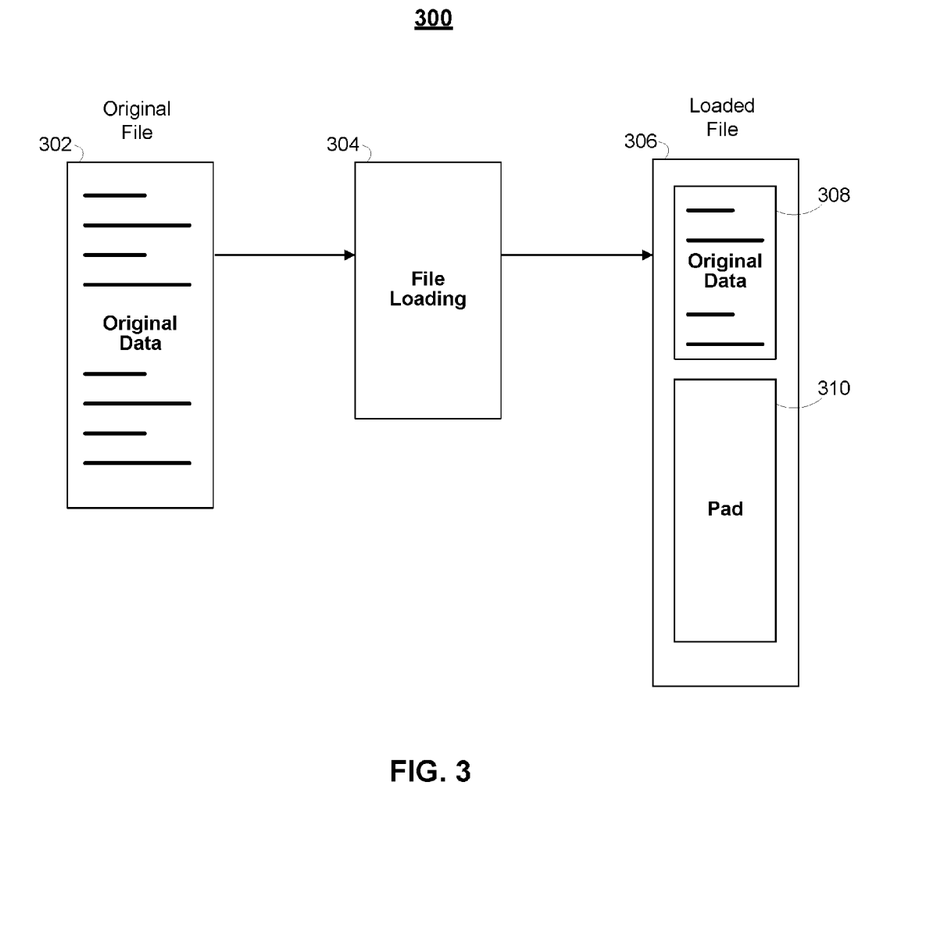
FIG. 3 includes a diagram of an electronic file loading process according to an illustrative embodiment of the disclosure.

FIG. 3 includes a diagram of an electronic file loading process 300 according to an illustrative embodiment of the disclosure. According to the process, a file loading function 304 (which may be an application, hardware, or combination thereof), e.g., a file loader, converts an original file 302 into a loaded file 306 that includes the original data 308 from the original file 302 along with a pad 310 of added data. In one aspect, the pad 310 includes a known and/or derivable pattern or sequence of data elements that may be used by a network monitor, device monitor, or application to detect the transfer or another operation (e.g., copy, download, move, transfer, etc.) of the loaded file. For example, the computer 118, 106, and/or 116 may include a monitor program and/or application that monitors file system operations or other operations on computer 106. The monitor program may check files attached to emails or during a copying/transfer operation for certain data patterns to determine whether a loaded file is being operated on. In one aspect, the data pattern of a pad may be unique to a particular file, enabling the monitor to identify the particular file and/or information being operated on.

A data file may be loaded at certain times and/or under certain conditions. For example, the file creator, via an application (e.g., the file loading function 304), may designate a file as "secret." The file loading application 304 may then load the file 302 with data in pad 310. In another aspect, the file loading application 304 automatically loads a file with pad 310 data based on at least one of the computer system storage capacity, typical removable media storage capacity, computer system file transfer, or data download transfer rates. The level of sensitivity of information within a file may be included as metadata in a file, and/or the file loading application 304 may have access to a list/database indicating the level of sensitivity of files in a location, folder, datastore, and/or computer system. The size of the pad 310 can vary. For example, the size of the pad 310 may range from 1 bit to Gigabytes, Terabytes, and even higher. The size of the pad 310 may be limited only by the available memory of the host data storage medium, which may include a datastore, computer system, network of datastores, and the like.

The file loading application 304 may operate or be invoked only when certain operating system actions and/or application actions are initiated. For example, files within a certain folder of a file system may be designated for loading. While a user performs editing and/or other operations on a file within the folder, no loading of the file is initiated. However, if the user attempts to move, transfer, and/or download the file, cut/paste, or attach the file to an email (or other data transport application), the file loading application 304 may automatically load the file with a data pad 310 to increase the file size according to configured file sizing/loading rules. Thus, a user of a file (e.g., using an editor) would not experience delays or inefficiencies that could be caused by an application having to open, close, save (or perform another operation on) a large loaded file. Instead, the file can be loaded only prior to moving, transferring, copying, cutting/pasting portions of, a file. One advantage to this approach is that a nefarious user is prevented from using a metadata stripper or file cleaner application (e.g., iScrub) to remove padding (e.g., the data pad 310) from a file prior to transferring the file, while also allowing more efficient operations on a non-padded file by a legitimate user. In another aspect, an application 304 and/or file management application can load files and store the loaded files in a datastore when the files are initially created and/or received, but when an authorized application (e.g., MS Word) performs on operation on the file, the application 304 and/or file management application can restore the file to its original unloaded format prior to the authorized applications use. Once the authorized application is finished with its operation, the file can then be re-loaded into its loaded format for storage.

In another configuration, the file loading application 304 and/or a file management application may allow one or more authorized users to restore a loaded file to its original size and format to allow for authorized transfer of a file. In this instance, a user may be required to enter a password, enter a secret key, use a token, use biometric authentication, and/or use a smart card to authenticate themselves to the file management application or computer system.

In certain aspects, the amount of file padding depends on the size of the removable media that can interface with a computer system holding sensitive data files. For example, if the computer system supports a USB flash drive up to a capacity of 32 MB, the file loading application 304 may load a highly sensitive file with padding such that it's total file size is greater than 32 MB. Because a 32 MB USB drive may actually have only 30 MB of storage, highly sensitive files may be loaded to greater than 30 MB. In such a scenario, the custodian of the highly sensitive files may desire to prevent the transfer of a particular file to a removable storage device. In another scenario, the custodian may be concerned with the transfer of a large number of files to removable storage devices. Thus, if the computer system includes 100 sensitive files, the file loading application may load each sensitive file to 1 MB such that it would require multiple 32 MB USB flash drives to download all of the sensitive files.

In a system with thousands of sensitive files, a user would need many USB flash drives to download all of the sensitive files, or would need to use one or more USB flash drives many times to download all of the sensitive data files. Thus, the user's activities would be more readily detectable by other security mechanisms, especially, for example, if an employee and/or user is observed with many USB flash drives or observed repeatedly downloading files to one or more USB flash drives. Similarly, if a computer system includes a CD-RW interface, the file loading application 304 may load each sensitive file to a size of about 20 MB (assuming a CD-ROM and/or CD-RW capacity of about 650 MB). Thus, a CDROM or CD-RW can store about 32 files. If there are 100 sensitive files on the computer system, a user would need at least 4 CDROMs to download all 100 sensitive files. If the computer system includes thousands of sensitive files, a user would need hundred of CD-ROMs or CD-RWs and spend a substantial amount of time downloading all of the files.

The amount of file loading may be adjusted dynamically. For example, over time, processing power, network data rates, and/or data storage capacity (of a computer system/network, datastore, and/or removable media) may increase. The file loading application 304 can account for such increases by increasing the amount of file loading. If the storage capacity, processing power, and/or transfer rate decrease for some reason, the file loading application 304 can decrease file loading of select files. If the sensitivity level associated with a file changes, the amount of file loading can be adjusted. It may occur that copies of the same file have different loading depending on the configuration of its host environment (e.g., host processing power, network data rate, peripheral media device download data rate, data storage capacity of system/network and/or removable media storage device).

In certain aspects, the computer system and/or file loading application 304 can limit the types of removable media storage devices that can operate with a computer system and/or data storage device, or block the operation of certain types of removable media storage. For example, a computer system may have a CD-ROM/CD-RW and two USB interfaces. The file loading application 304 and/or an operating system may be configured to allow only USB flash drives up to 32 MB to interface with a computer system, but inhibit the use of a writable CD-ROM (CD-RW) drive. In one approach, the file loading application 304 may detect and remove the driver and/or configuration for a writable CD-ROM (CD-RW). In another feature, the operating system (e.g., Windows, LINUX, MAC OS) is configured to prevent the use of certain removable media storage devices.

In certain aspects, the computer system and/or file loading application 304 can adjust the loading of select sensitive files based on download or transfer rate of the removable media interface or the data transfer rate in a computer network. For example, a common technology for transferring digital video to a home PC has been the Institute of Electrical and Electronics Engineers (IEEE) 1394 standard. Also known as FireWire, it has a 400 Mbps data transfer rate.

A new version of USB, USB 2.0, with a 480 Mbps data transfer rate, makes it faster than IEEE 1394 (FireWire), earning the nickname Hi-Speed USB. USB devices are typically operated at either 12 Mbps (for full-speed devices) or 1.5 Mbps (for devices with lower bandwidth needs). USB 2.0 enables more of those devices at once and also adds a new speed, which can use the entire 480 Mbps bandwidth that USB 2.0 provides for Hi-Speed devices. Such high speeds are critical in bandwidth-hungry applications like mass storage devices, although not all devices are capable of running at 480 Mbps. For example, a USB 2.0 mouse remains a low speed device and is likely running at only 1 Mbps, but a USB 2.0 Hi-Speed CD-RW can take advantage of the new USB 2.0 high speeds and burn CDs much faster.

In certain embodiments, the file loading application 304 may load select sensitive files based on the transfer rate of certain removable media storage devices. For example, if only lower bandwidth USB devices are allowed to interface with a computer (at 1.5 Mbps), each sensitive file may be loaded to 1.5 MB (Megabytes). Thus, it would take about 8 seconds to download each sensitive file. (note: there are 8 bits per byte. Therefore, a 1.5 MB file has 12 Mbits of data). If there are 10,000 sensitive files, it would take about 80,000 seconds, which is about 22.2 hours, to download all files. Such an extended transfer of files over 22 hours, whether contiguous or segmented over multiple periods, would substantially increase the exposure of a user to detection by a network or computer monitor, or physical security personnel that may be observing the user's physical and/or electronic activity.

In certain embodiments, the file loading application 304 may load select sensitive files based on the network data rate that a storage device and/or host computer system resides on. For example, the network may use 10 Mbps Ethernet, 100 Mbit Ethernet (e.g., 100BaseT), or 1000 Mbps (Gigabit) Ethernet. Typically, about 50% of the Ethernet capacity may be usable. For example, with 100 Mbps Ethernet, at about a 50% data transfer rate is about 4.7 to 6 MB/s (max). For Gigabit Ethernet, the data transfer rate (assume about 50% capacity) would be about 47 to 60 MB/s transfer rate. Thus, the file loading application 304 may load one or more sensitive files (within a 100BaseT Ethernet network) to about 60 MB. Thus, if there are 10,000 sensitive files, it would take about 27.77 hours to transfer all 10,000 files via the Ethernet network from the host computer system to another data storage location.

In certain aspects, the file loading application 304 loads one or more sensitive files with an amount of padding depending on the sensitivity and/or value of the information within a data file. For example, a government entity may designate information in four categories such as top secret, secret, confidential, nonpublic. Files designated as top secret may include highly sensitive information for which secrecy of the data is a priority. For top secret files, the file loading application 304 may load a file such that its size is greater than the storage capacity of certain removable (and/or writable) media storage devices, or of a size that requires a total transfer time through a network or to a removable media storage device that is greater that a minimal transfer time. For example, the file loading application 304 may be configured to load select sensitive files such that a total data transfer time of the file is greater than, for example, 1 hour. The minimal data file transfer time may be greater than about 1 second, 5 seconds, 10 seconds, 30 seconds, 1 minute, 10 minutes, 30 minutes, 1 hr, 2, hrs, 5 hrs, 10 hrs, 24 hrs, 48 hrs, 72 hrs, 1 week, 2 weeks, 1 month, and 1 year.

As discussed previously, the file loading application 304 may utilize a combination of anyone or more of the above factors to determine the appropriate file loading of a sensitive file.

Figure 4:
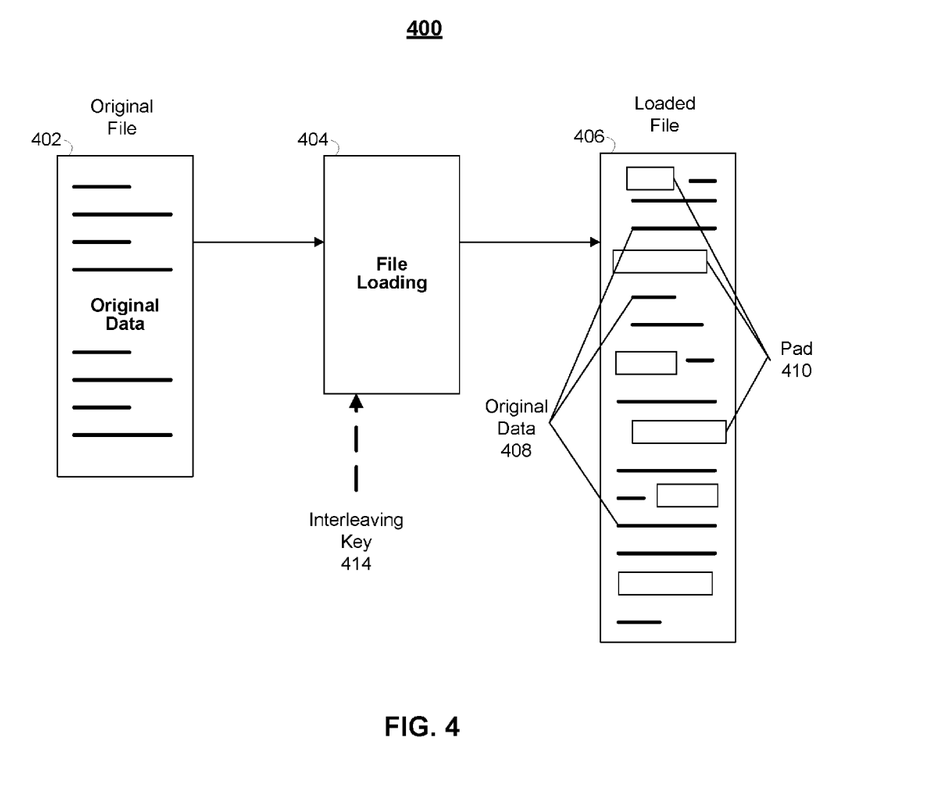
FIG. 4 includes a diagram of an electronic file loading process including data interleaving according to an illustrative embodiment of the disclosure.

FIG. 4 includes a diagram of an electronic file loading process 400 including data interleaving according to an illustrative embodiment of the disclosure. According to the process 400, a file loading function 404 (which may be an application, hardware, or combination thereof) converts an original file 402 into a loaded file 406 that includes the original data 408 from the original file 402 along with a pad 410 of added data. In one aspect, the pad 410 includes a known and/or derivable pattern or sequence of data elements that may be used by a network monitor, device monitor, or application to detect the transfer or operation (e.g., copy, download, move, etc.) of the loaded file. Various operations to create a loaded file 406 can be initiated and/or performed as described for the file 302 with respect to FIG. 3. One additional feature disclosed with respect to FIG. 4, is the ability to interleave the original data 408 with the pad 410 data such that the original information 308 is distributed throughout the loaded file. Interleaving has the advantage of reducing the ability of certain file stripping or cleaning applications from stripping away the pad 410 to restore the loaded file to the size of the original file 410. In one aspect, the file loading application 404 uses an interleaving key 414 to determine the interleaved locations of portions of the original data 408 within the loaded file 406. The file loading application 404 may use a pseudorandom function where the interleaving key 414 functions as a seed to determine a pseudorandom sequence and/or selection algorithm to determine where to place portions of the original data 408 within the loaded data file 406. The file loading application 404 may distribute data portions of equal or different sizes of the original data 402 throughout the loaded file 406.

Figure 5:
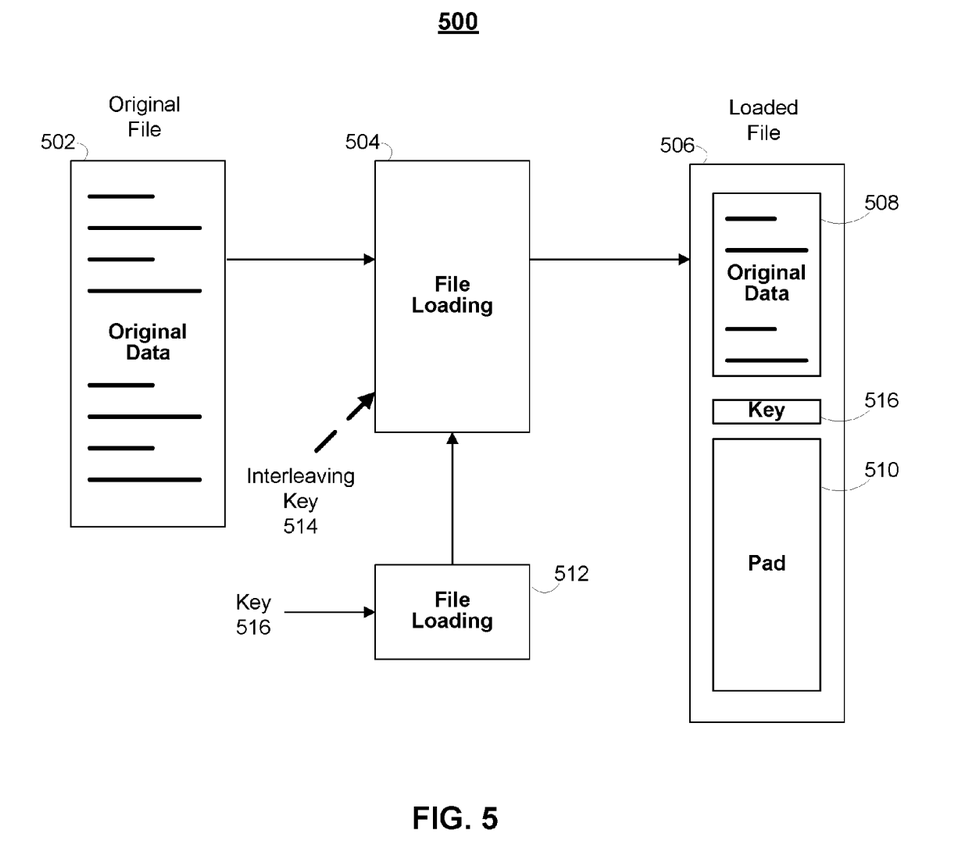
FIG. 5 includes a diagram of an electronic file loading process including a pad generator according to an illustrative embodiment of the disclosure.

FIG. 5 includes a diagram of an electronic file loading process 500 including a pad generator 512 according to an illustrative embodiment of the disclosure. According to the process 500, a file loading function 504 (which may be an application, hardware, or combination thereof) converts an original file 502 into a loaded file 506 that includes the original data 508 from the original file 502 along with a pad 510 of added data. In one aspect, the pad 510 includes a known and/or derivable pattern or sequence of data elements that may be used by a network monitor, device monitor, or application to detect the transfer or operation (e.g., copy, download, move, etc.) of the loaded file. Various operations to create a loaded file 506 can be initiated and/or performed in the same manners as described with respect to files 302 and 402, and with respect to FIGS. 3 and 4.

Additionally, FIG. 5 illustrates the use of a key pad generator 512 which may be implemented in hardware and/or software. The pad generator 512 may include a table of known pad 510 patterns, a random number generator, and/or pseudorandom number generator. The pad generator 512 may use a key 516 (e.g., number, alphanumeric value, and the like) that determines the pattern of elements of the pad 510. In one aspect, the pattern of the pad 510 is unique to a select sensitive file to enable the file to be uniquely identified even if the file name is changed. In another aspect, the pattern of the pad 510 may be unique to a set of sensitive files. The set may be based on degree of sensitivity (top secret, secret, etc. . . . ), the location of the sensitive file (particular facility, ship, office, department, entity, individual, role (President), etc.). As one option, the key 516 is stored in the loaded file 506 so that a monitor application checking the file is able to confirm the pattern. Including the key 516 in a loaded file can advantageously enable a monitor application to check the pad pattern and/or confirm the file's identity. While a nefarious user may also access the key, it will still take time and resources to access the key 516, exposing the user to detection. Such activity could be tracked and/or logged to enable detection by a monitor application. The interleaving key 514 may also be stored in the file 506.

The key 516 may alternatively or additionally be stored at another network location and/or with a network monitor application so that only the monitor application (e.g., file loading application 304) is able to confirm the proper pad 510 pattern. Where the original data 508 and pad 510 are interleaved, the original data 508 may effectively be hidden with a large amount of pad 510 data (i.e., a needle in a hay stack). In one aspect, the key 516 or another interleaving key 514 may be used to determine the interleaving locations within the loaded file 406 and/or 506. Thus, only an application with access to the interleaving key 514 will be able to strip away the pad 510 to recover the original data 508. The monitor may also check the size of the loaded file and/or pad 510 to confirm that the size is the same as set, pre-configured, and/or determined file loading size.

The file loading application 304 may load a data pad 310, 410, 510, or portion thereof, as metadata in a data file. Depending on the file format (see File Format section herein), the file loading application 304 can load the data pad 510 in one or more file locations delimited as metadata or other data that an application (e.g., MS Word) which normally uses the file would not display to a user. For example, a MS Word document may be loaded with a pad 310, 410, 510 to increase the file size to 10 MB. Yet, when a user opens the file using MS Word, only the original information is displayed to the user during normal viewing via the editor display. In one approach, padding may be loaded as a property, custom property, author information, and tracked changes. Alternatively, the data pad 310, 410, 510, or a portion thereof, can be embedded in the information portion of a data file. In one configuration, the data pad 310, 410, 510 is appended to and displayed at the end of the information document. At the end of the displayed original (prior to file loading) document, a delimiting element and/or phrase may be included (e.g., "**Pad Information follows**"), followed by a pattern/sequence of elements of the pad 310, 410, 510. This approach has a disadvantage of including the pad 310, 410, or 510 in the displayed document, but has the advantage of including the pad in the delimited information portion of a data file, which can inhibit data stripping of the pad 310, 410, 510.

In one aspect, a file management application (e.g., filesite) may have access to the pattern key 512 and/or the interleaving key 514. The file loading application 304 may be operated by a file management application.

In certain aspects, the file loading application 304 can change the format of a selected sensitive file. The change in format may include interleaving the original data 408 with a pad 410. The file loading application 304 may change the file extension of a formatted data file to enable an application to recognize that the file has a file loading format. An application (e.g., MS Word, Adobe Acrobat, and the like) may include functionality to restore the loaded file, or a portion thereof, to its original format. The file loading application 304 and/or a file management application may restore the file to its original format, i.e., the format prior to file loading and/or interleaving.

Figure 6:
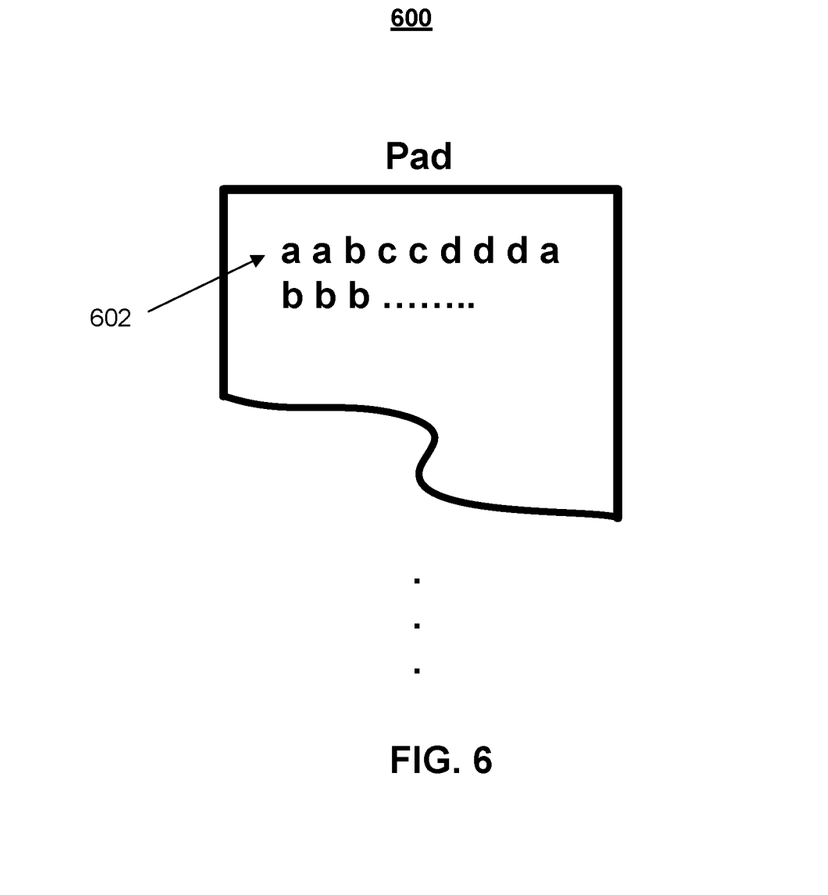
FIG. 6 includes an exemplary data pattern of a file pad according to an illustrative embodiment of the disclosure.

FIG. 6 includes an exemplary data pattern 602 of a file pad 600 according to an illustrative embodiment of the disclosure. While pattern 602 is illustrative, a pattern may be in the form of a binary sequence of 0s and 1s, as a hexadecimal sequence, as a alpha-numeric sequence, or any type of representation of data within an electronic file.

The data file and/or pad for a loaded file may be encrypted to increase data security, not only to protect disclosure of the information in a file, but also to inhibit a data stripping or cleaning application from conveniently stripping the pad data from a loaded file. Because certain operating systems, databases, and computer systems compress files for storage, the amount of loading and/or the size of a pad 310, 410, 510 can be configured and/or adjusted such that the compressed file size meets the system size requirement and/or threshold. Thus, if the size limit is 1 MB, a file may be loaded to a size of 10 MB because its compressed size will be about 1 MB.

Certain document processing applications may set limits on the size of files that they will operate with. For example, MS Word 7 will only handle documents having a maximum size of 32 MB. In configurations where file loading requires loading a Word-based document to increase its size above 32 MB, the file loading application 304 or another application (e.g., MS Word) may split the document into multiple subdocuments. If the required file size must be 50 MB, the application may split an original file into two subdocument files. The application can then manage the subdocument files using a master document. Although cumbersome enough to deter possible constant editing and referencing within the documents, namely, such an approach enables file loading and use of such large files. Other more stable tools may employed with Word, including INCLUDETEXT and RD fields. In one configuration, original data or information may be interleaved among pad data throughout multiple subdocuments. Certain other file formats may limit a file's size and, hence, the amount of file loading. For example, a file format based on FAT32 will have a file size limit of 4 GB. Adobe Acrobat files have a 100 MB limit. Photoshop documents have a 2 GB size limit.

Again, the file loading application 304, another application, and/or a file management application (e.g., Sharepoint) may implement any one of various mechanisms to manage files having sizes larger than typical system limits. As discussed above, the application may create multiple subfiles and/or subdocuments of a loaded file such that the subfiles meet the file size limitations of an application that uses the file (e.g., MS Word), an operating system (Windows), and/or a file management system (e.g., Filesite, Sharepoint, etc. . . . ). However, in certain configurations and based on certain security requirements, the set file loading size (or size of loaded files) may not exceed standard application file size limits. Thus, file loading of selected sensitive files may not require additional file processing procedures to manage file size with respect to an application that normal uses a particular type of file.

In another feature, the file loading application or another application may convert files in one format to another format that supports larger data file size limits. For example, the application 304 may convert a MS Word document (having a 32 MB file size limit) to an Adobe Acrobat document (having a 100 MB file size limit) so that the information can be stored in a loaded file having a size of about 50 MB. In this way, it would not be necessary to create and manage two Word subdocuments having a total size 50 MB. In another aspect, the application 304 may convert a document in one format have a file size limit to a second format having no file size limit or a higher file size limit.

The foregoing exemplary systems may be applied to various types of commercial, government, and/or personal information. For example, the U.S. Social Security Administration may wish to prevent convenient downloading of sensitive files including social security numbers and other personal information. They may choose to load the files to make the transfer of such files more cumbersome and, therefore, less susceptible to nefarious transfer. A bank or insurance company may wish to protect certain sensitive data files related to the business finances and/or finances of customers. A state healthcare administrator, hospital, healthcare provider, or Doctor may wish load medical records of patients and/or clients to make it harder for someone to transfer patient data files from a private/protected datastore. A government agency, such as the U.K. Ministry of Defense (MoD) or U.S. Department of Defense (DoD) may wish to load classified documents. An individual, who stores important and sensitive data on a home computer system, may want to load certain sensitive files to prevent hackers from extracting such files. An electronic library, cloud datastore, network datastore, and the like may want to load certain files with padding. Any entity concerned with preventing efficient transfer of important information in their custody can advantageously employ file loading to inhibit file transfer, copying, downloading, and the like, without a set degree of needed resources, effort, and time.

In another aspect, the application 304 may encapsulate an original data file and a pad data file into a new data storage file, i.e., a resulting loaded file. In one configuration, multiple data files may be combined with one or more pad data files to form a new data storage file.

File Formats

A file format is a particular way that information is encoded for storage in a computer file. Since a disk drive, or indeed any computer storage, can store only bits, the computer must have some way of converting information to 0s and 1s and vice-versa. There are different kinds of formats for different kinds of information. Within any format type, e.g., word processor documents, there will typically be several different formats. Sometimes these formats compete with each other. File formats are divided into proprietary and open formats.

Generality

Some file formats are designed for particular types of data: PNG files, for example, store bitmapped images using lossless data compression. Other file formats, however, are designed for storage of several different types of data: the Ogg format can act as a container for many different types of multimedia, including any combination of audio and/or video, with or without text (such as subtitles), and metadata. A text file can contain any stream of characters, encoded for example as ASCII or Unicode, including possible control characters. Some file formats, such as HTML, Scalable Vector Graphics and the source code of computer software, are also text files with defined syntaxes that allow them to be used for specific purposes.

Many file formats, including some of the most well-known file formats, have a published specification document (often with a reference implementation) that describes exactly how the data is to be encoded, and which can be used to determine whether or not a particular program treats a particular file format correctly. There are, however, two reasons why this is not always the case. First, some file format developers view their specification documents as trade secrets, and therefore do not release them to the public. Second, some file format developers never spend time writing a separate specification document; rather, the format is defined only implicitly, through the program(s) that manipulate data in the format.

Most modern operating systems, and individual applications, need to use all of these approaches to process various files, at least to be able to read 'foreign' file formats, if not work with them completely.

Filename Extension

One way of identifying file formats in use by several operating systems, including Windows, Mac OS X, CP/M, DOS, VMS, and VM/CMS, is to determine the format of a file based on the section of its name following the final period. This portion of the filename is known as the filename extension. For example, HTML documents are identified by names that end with .htm (or .html), and GIF images by .gif. In the original FAT filesystem, filenames were limited to an eight-character identifier and a three-character extension, which is known as 8.3 filename. Many formats thus still use three-character extensions, even though modern operating systems and application programs no longer have this limitation. Since there is no standard list of extensions, more than one format can use the same extension, which can confuse the operating system and consequently users.

Internal Metadata

Another way to identify a file format is to store information regarding the format inside the file itself. Usually, such information is written in one (or more) binary string(s), tagged or raw texts placed in fixed, specific locations within the file. Since the easiest place to locate them is at the beginning of it, such area is usually called a file header when it is greater than a few bytes, or a magic number if it is just a few bytes long.

File Header

Meta-data contained in a file header is not necessarily stored only at the beginning of the file, but might be present in other areas too, often including the end of the file; that depends on the file format or the type of data it contains. Character-based (text) files have character-based human-readable headers, whereas binary formats usually feature binary headers, although that is not a rule: a human-readable file header may require more bytes, but is easily discernable with simple text or hexadecimal editors. File headers may not only contain the information required by algorithms to identify the file format alone, but also real metadata about the file and its contents. For example most image file formats store information about image size, resolution, colour space/format and optionally other authoring information like who, when and where it was made, what camera model and shooting parameters was it taken with (if any, cfr. Exif), and so on. Such metadata may be used by a program reading or interpreting the file both during the loading process and after that, but can also be used by the operating system to quickly capture information about the file itself without loading it all into memory.

Magic Number

One way to incorporate such metadata, often associated with Unix and its derivatives, is just to store a "magic number" inside the file itself. Originally, this term was used for a specific set of 2-byte identifiers at the beginning of a file, but since any undecoded binary sequence can be regarded as a number, any feature of a file format which uniquely distinguishes it can be used for identification. GIF images, for instance, always begin with the ASCII representation of either GIF87a or GIF89a, depending upon the standard to which they adhere. Many file types, most especially plain-text files, are harder to spot by this method. HTML files, for example, might begin with the string <html> (which is not case sensitive), or an appropriate document type definition that starts with <!DOCTYPE, or, for XHTML, the XML identifier, which begins with <?xml. The files can also begin with HTML comments, random text, or several empty lines, but still be usable HTML.

The magic number approach offers better assurances that the format will be identified correctly, and can often determine more precise information about the file. Since reasonably reliable "magic number" tests can be fairly complex, and each file must effectively be tested against every possibility in the magic database, this approach is relatively inefficient, especially for displaying large lists of files (in contrast, filename and metadata-based methods need check only one piece of data, and match it against a sorted index). Also, data must be read from the file itself, increasing latency as opposed to metadata stored in the directory. Where filetypes don't lend themselves to recognition in this way, the system must fall back to metadata. It is, however, the best way for a program to check if a file it has been told to process is of the correct format: while the file's name or metadata may be altered independently of its content, failing a well-designed magic number test is a pretty sure sign that the file is either corrupt or of the wrong type. On the other hand a valid magic number does not guarantee that the file is not corrupt or of a wrong type.

So-called shebang lines in script files are a special case of magic numbers. Here, the magic number is human-readable text that identifies a specific command interpreter and options to be passed to the command interpreter.

Another operating system using magic numbers is AmigaOS, where magic numbers were called "Magic Cookies" and were adopted as a standard system to recognize executables in Hunk executable file format and also to let single programs, tools and utilities deal automatically with their saved data files, or any other kind of file types when saving and loading data. This system was then enhanced with the Amiga standard Datatype recognition system. Another method was the FourCC method, originating in OSType on Macintosh, later adapted by Interchange File Format (IFF) and derivatives.

External Metadata

A final way of storing the format of a file is to explicitly store information about the format in the file system, rather than within the file itself. This approach keeps the metadata separate from both the main data and the name, but is also less portable than either file extensions or "magic numbers", since the format has to be converted from filesystem to filesystem. While this is also true to an extent with filename extensions—for instance, for compatibility with MS-DOS's three character limit—most forms of storage have a roughly equivalent definition of a file's data and name, but may have varying or no representation of further metadata.

Zip files or archive files solve the problem of handling metadata. A utility program collects multiple files together along with metadata about each file and the folders/directories they came from all within one new file (e.g. a zip file with extension .zip). The new file is also compressed and possibly encrypted, but now is transmissible as a single file across operating systems by FTP systems or attached to email. At the destination, it must be unzipped by a compatible utility to be useful, but the problems of transmission are solved this way.

Mac OS Type-Codes

The Mac OS' Hierarchical File System stores codes for creator and type as part of the directory entry for each file. These codes are referred to as OSTypes, and for instance a HyperCard "stack" file has a creator of WILD (from Hypercard's previous name, "WildCard") and a type of STAK. The type code specifies the format of the file, while the creator code specifies the default program to open it with when double-clicked by the user. For example, the user could have several text files all with the type code of TEXT, but which each open in a different program, due to having differing creator codes. RISC OS uses a similar system, consisting of a 12-bit number which can be looked up in a table of descriptions—e.g. the hexadecimal number FF5 is "aliased" to PoScript, representing a PostScript file.

Mac OS X Uniform Type Identifiers (UTIs)

A Uniform Type Identifier (UTI) is a method used in Mac OS X for uniquely identifying "typed" classes of entity, such as file formats. It was developed by Apple as a replacement for OSType (type & creator codes). The UTI is a Core Foundation string, which uses a reverse-DNS string. Common or standard types use the public domain (e.g. public.png for a Portable Network Graphics image), while other domains can be used for third-party types (e.g. com.adobe.pdf for Portable Document Format). UTIs can be defined within a hierarchical structure, known as a conformance hierarchy. Thus, public.png conforms to a supertype of public.image, which itself conforms to a supertype of public.data. A UTI can exist in multiple hierarchies, which provides great flexibility.

In addition to file formats, UTIs can also be used for other entities which can exist in OS X, including:
  Pasteboard data
  Folders (directories)
  Translatable types (as handled by the Translation Manager)
    Bundles
    Frameworks
    Streaming data
    Aliases and symlinks OS/2 Extended Attributes The HPFS, FAT12 and FAT16 (but not FAT32) filesystems allow the storage of "extended attributes" with files. These comprise an arbitrary set of triplets with a name, a coded type for the value and a value, where the names are unique and values can be up to 64 KB long. There are standardized meanings for certain types and names (under OS/2). One such is that the ".TYPE" extended attribute is used to determine the file type. Its value comprises a list of one or more file types associated with the file, each of which is a string, such as "Plain Text" or "HTML document". Thus a file may have several types.

The NTFS file system also allows to store OS/2 extended attributes, as one of file forks, but this feature is merely present to support the OS/2 subsystem (not present in XP), so the Win32 subsystem treats this information as an opaque block of data and does not use it. Instead, it relies on other file forks to store meta-information in Win32-specific formats. OS/2 extended attributes can still be read and written by Win32 programs, but the data must be entirely parsed by applications.

POSIX Extended Attributes

On Unix and Unix-like systems, the ext2, ext3, ReiserFS version 3, XFS, JFS, FFS, and HFS+ filesystems allow the storage of extended attributes with files. These include an arbitrary list of "name=value" strings, where the names are unique and a value can be accessed through its related name.

PRONOM Unique Identifiers (PUIDs)

The PRONOM Persistent Unique Identifier (PUID) is an extensible scheme of persistent, unique and unambiguous identifiers for file formats, which has been developed by The National Archives of the UK as part of its PRONOM technical registry service. PUIDs can be expressed as Uniform Resource Identifiers using the info:pronom/ namespace. Although not yet widely used outside of UK government and some digital preservation programmes, the PUID scheme does provide greater granularity than most alternative schemes.

MIME Types

MIME types are widely used in many Internet-related applications, and increasingly elsewhere, although their usage for on-disc type information is rare. These consist of a standardised system of identifiers (managed by IANA) consisting of a type and a sub-type, separated by a slash—for instance, text/html or image/gif. These were originally intended as a way of identifying what type of file was attached to an e-mail, independent of the source and target operating systems. MIME types identify files on BeOS, AmigaOS 4.0 and MorphOS, as well as store unique application signatures for application launching. In AmigaOS and MorphOS the Mime type system works in parallel with Amiga specific Datatype system.

File Format Identifiers (FFIDs)

File format identifiers is another, not widely used way to identify file formats according to their origin and their file category. It was created for the Description Explorer suite of software. It is composed of several digits of the form NNNNNNNNN-XX-YYYYYYY. The first part indicates the organisation origin/maintainer (this number represents a value in a company/standards organisation database), the 2 following digits categorize the type of file in hexadecimal. The final part is composed of the usual file extension of the file or the international standard number of the file, padded left with zeros. For example, the PNG file specification has the FFID of 000000001-31-0015948 where 31 indicates an image file, 0015948 is the standard number and 000000001 indicates the ISO Organisation.

File Content Based Format Identification

Another way to identify the file format is to look at the file contents for distinguishable patterns among file types. As we know, the file contents are sequence of bytes and a byte has 256 unique patterns (0~255). Thus, counting the occurrence of byte patterns that is often referred as byte frequency distribution gives distinguishable patterns to identify file types. There are many content based file type identification schemes that use byte frequency distribution to build the representative models for file type and use any statistical and data mining techniques to identify file types.

File Structure

There are several types of ways to structure data in a file.

Unstructured Formats (Raw Memory Dumps)

Earlier file formats used raw data formats that consisted of directly dumping the memory images of one or more structures into the file. Developing tools for reading and writing these types of files is very simple. The limitations of the unstructured formats led to the development of other types of file formats that could be easily extended and be backward compatible at the same time.

Chunk-Based Formats

Electronic Arts and Commodore-Amiga pioneered this file format in 1985, with their IFF (Interchange File Format) file format. In this kind of file structure, each piece of data is embedded in a container that contains a signature identifying the data, as well the length of the data (for binary encoded files). This type of container is called a "chunk". The signature is usually called a chunk id, chunk identifier, or tag identifier. With this type of file structure, tools that do not know certain chunk identifiers simply skip those that they do not understand.

This concept has been adopted by RIFF (Microsoft-IBM equivalent of IFF), PNG, JPEG storage, DER (Distinguished Encoding Rules) encoded streams and files (which were originally described in CCITT X.409:1984 and therefore predate IFF), and Structured Data Exchange Format (SDXF). Even XML can be considered a kind of chunk based format, since each data element is surrounded by tags which are akin to chunk identifiers.

Directory-Based Formats

This is another extensible format, that closely resembles a file system (OLE Documents are actual filesystems), where the file is composed of 'directory entries' that contain the location of the data within the file itself as well as its signatures (and in certain cases its type). Good examples of these types of file structures are disk images, OLE documents and TIFF images Document File Format A document file format is a text or binary file format for storing documents on a storage media, especially for use by computers. There currently exist a multitude of incompatible document file formats.

It appears that XML is to be the basis for future document file formats. Examples of XML-based open standards are DocBook, XHTML and, more recently, the ISO/IEC standards OpenDocument (ISO 26300:2006), Office Open XML (ISO 29500:2008).

In 1993 the ITU-T tried to establish a standard for document file formats, known as the Open Document Architecture (ODA) which was supposed to replace all competing document file formats. It is described in ITU-T documents T.411 through T.421, which are equivalent to ISO 8613. It did not succeed.

Page description languages such as PostScript and PDF have become the de facto-standard for documents that a typical user should only be able to create and read, not edit. In 2001 the PDF format has become also the international ISO/IEC standard (ISO 15930-1:2001, ISO 19005-1:2005, ISO 32000-1:2008).

HTML is the most used and open international standard and it is also used as document file format. It has become also ISO/IEC standard (ISO 15445:2000).

The default binary file format used by Microsoft Word (.doc) has become widespread de facto-standard for office documents, but it is a proprietary format and is not always fully supported by other word processors.

In certain aspects, a file loading system comprises: a datastore for storing a plurality of data files where each of the plurality of data files includes information, and a processor arranged to: access the plurality of data files in the datastore, and load a data pad into one or more of the plurality of data files to increase the size of the one or more of the plurality of data files. The processor may change the file format of at least one of the plurality of data files from a first file format to a second file format In one configuration, the processor loads the data pad in response to an operation associated with the one or more of the plurality of data files. The operation may include at least one of copy, move, transfer, cut, paste, attach, delete, and send. The processor may automatically load the data pad in response to the operation. The size of the one or more data files may be determined based on at least one of the sensitivity of one or more of data files, the data transfer rate of a network in which the datastore resides, the data capacity of one or more removable media storage devices capable of interfacing with the datastore, the data capacity of the datastore, and the processing power of the processor. The sensitivity may be based on at least one of the value of the information, the need for secrecy of the information, and the need for privacy of the information.

The processor may interleave portions of the information in each data file throughout the data pad in each of the one or more of the plurality of data files. The interleaved portions of information of the each data file may be interleaved base on an interleaving key. The data pad may include a pattern of data elements. The pattern of data elements may be based on a pseudorandom function. The pattern of data elements may be based on a pattern key.

A monitor may be arranged to monitor an operation associated with the one or more of the plurality of data files. The monitoring may include inspecting the data pad within the one or more of the plurality of data files. The monitor may store at least one key related to the one or more of the plurality of data files. The monitor may use the at least one key to confirm that the pattern of the data pad within the one or more of the plurality of data files is correct. The monitor may identify the one or more of the plurality of data files based on the data pad. The monitor may monitor the processor to determine whether at least one of a file stripping application is running, a file fragmentation application is running, and a file transfer application is running. The size of the one or more data files may be set such that the size does not exceed the maximum size limit associated with the format of the one or more data files.

In another aspect, a method for file loading comprises: storing a plurality of data files where each of the plurality of data files includes information, accessing the plurality of data files in the datastore, and loading a data pad into one or more of the plurality of data files to increase the size of the one or more of the plurality of data files.

In another aspect, a method for inhibiting the transfer of data comprises: storing a plurality of data files in a host datastore where each of the plurality of data files includes sensitive information, estimating a data size needed for a portion of the plurality of data files to inhibit their transfer from the datastore, and loading each of the plurality of data files with padding such that the data size of the portion of the plurality of data files is greater than or equal to the estimated data size.

It will be apparent to those of ordinary skill in the art that certain aspects involved in the operation of the controller 102 may be embodied in a computer program product that includes a computer usable and/or readable medium. For example, such a computer usable medium may consist of a read only memory device, such as a CD ROM disk or conventional ROM devices, or a random access memory, such as a hard drive device or a computer diskette, or flash memory device having a computer readable program code stored thereon.

Those skilled in the art will know or be able to ascertain using no more than routine experimentation, many equivalents to the embodiments and practices described herein. Accordingly, it will be understood that the invention is not to be limited to the embodiments disclosed herein, but is to be understood from the following claims, which are to be interpreted as broadly as allowed under the law.

What is claimed is:

1. A file loading system comprising:
a datastore for storing a plurality of data files, each of the plurality of data files including information, a removable media storage device capable of interfacing with the datastore, the removable media storage device having a data storage capacity, a first computer arranged to:
   access the plurality of data files in the datastore, and
   load a data pad into one or more of the plurality of data files to increase the size of the one or more of the plurality of data files based on the data storage capacity of the removable media storage device,
wherein the increased size of the one or more of the plurality of data files, being based on the data storage capacity of the removable media storage device, inhibits a transfer of the one or more of the plurality of data files from the datastore to the removable media storage device and wherein the data pad includes a pattern of data elements.

2. The system of claim 1, wherein the increased size of the one or more data files is further determined based on at least one of the sensitivity of one or more of data files, the data transfer rate of a network in which the datastore resides, the data capacity of the datastore, and the processing power of the first computer.

3. The system of claim 2, wherein the sensitivity is based on at least one of the value of the information, the need for secrecy of the information, and the need for privacy of the information.

4. The system of claim 1, wherein the first computer loads the data pad in response to an operation associated with the one or more of the plurality of data files.

5. The system of claim 4, wherein the operation includes at least one of copy, move, transfer, cut, paste, attach, delete, and send.

6. The system of claim 1, wherein the first computer changes the file format of at least one of the plurality of data files from a first file format to a second file format.

7. The system of claim 1, wherein the first computer interleaves portions of the information with portions of the data pad in each of the one or more of the plurality of data files.

8. The system of claim 1, wherein the pattern of data elements is based on pseudorandom function.

9. The system of claim 8, wherein the pattern of data elements is based on a pattern key.

10. The system of claim 1 comprising a monitor arranged to monitor an operation associated with the one or more of the plurality of data files.

11. The system of claim 10, wherein monitoring includes inspecting the data pad within the one or more of the plurality of data files.

12. The system of claim 11, wherein the monitor stores at least one key related to the one or more of the plurality of data files.

13. The system of claim 12, wherein the monitor uses the at least one key to confirm that the pattern of the data pad within the one or more of the plurality of data files is correct.

14. The system of claim 11, wherein the monitor identifies the one or more of the plurality of data files based on the data pad.

15. The system of claim 10, wherein the monitor monitors the first computer to determine whether at least one a file stripping application is running, a file fragmentation application is running, and a file transfer application is running.

16. The system of claim 1, wherein the increased size of the one or more data files is set such that the size does not exceed the maximum size limit associated with the format of the one or more data files.

17. A method for file loading comprising:
   storing a plurality of data files in a datastore of an information system, each of the plurality of data files including information,
   accessing the plurality of data files in the datastore,
   providing a removable media storage device capable of interfacing with the datastore, the removable media storage device having a data storage capacity, and
   loading a data pad into one or more of the plurality of data files to increase the size of the one or more of the plurality of data files based on the data storage capacity of the removable media storage device,
   wherein the increased size of the one or more of the plurality of data files, being based on the data storage capacity of the removable media storage device, inhibits a transfer of the one or more of the plurality of data files from the datastore to the removable media storage device and wherein the data pad includes a pattern of data elements.

18. A method for inhibiting the transfer of data comprising:
   storing a plurality of data files in a datastore of an information system, each of the plurality of data files including sensitive information,
   providing one or more removable media storage devices capable of interfacing with the datastore,
   estimating a data size needed for a portion of the plurality of data files to inhibit their transfer from the datastore to the one or more removable media storage devices capable of interfacing with the datastore, the estimate being based on a data storage capacity of the one or more removable media storage devices, and
   loading each of the plurality of data files with padding such that the data size of the portion of the plurality of data files is greater than or equal to the estimated data size
   wherein the increased size of the one or more of the plurality of data files, being based on the storage capacity of the one or more removable media storage devices, inhibits a transfer of the one or more of the plurality of data files from the datastore to the one or more removable media storage devices and wherein the padding in each of the plurality of data files includes a pattern of data elements.

* * * * *